(12) United States Patent
Shibata et al.

(10) Patent No.: US 9,206,264 B2
(45) Date of Patent: Dec. 8, 2015

(54) METHOD FOR PRODUCING MODIFIED CONJUGATED DIENE BASED (CO)POLYMER, MODIFIED CONJUGATED DIENE BASED (CO)POLYMER, AND RUBBER COMPOSITION

(75) Inventors: Masahiro Shibata, Minato-ku (JP); Takaomi Matsumoto, Minato-ku (JP); Tamotsu Nagaoka, Minato-ku (JP); Takuo Sone, Minato-ku (JP); Toshihiro Tadaki, Minato-ku (JP)

(73) Assignee: JSR CORPORATION, Tokyo (JP)

( * ) Notice: Subject to any disclaimer, the term of this patent is extended or adjusted under 35 U.S.C. 154(b) by 802 days.

(21) Appl. No.: 13/347,115

(22) Filed: Jan. 10, 2012

(65) Prior Publication Data

US 2012/0108737 A1 May 3, 2012

Related U.S. Application Data

(63) Continuation of application No. 12/532,764, filed as application No. PCT/JP2008/055340 on Mar. 21, 2008, now Pat. No. 8,178,626.

(30) Foreign Application Priority Data

Mar. 23, 2007 (JP) ................. 2007-077963

(51) Int. Cl.

| | | |
|---|---|---|
| C08C 19/44 | (2006.01) | |
| C08C 19/12 | (2006.01) | |
| C08L 15/00 | (2006.01) | |
| C08L 21/00 | (2006.01) | |
| C08K 3/00 | (2006.01) | |
| C08K 3/04 | (2006.01) | |
| C08K 3/34 | (2006.01) | |
| C08K 3/36 | (2006.01) | |
| C08K 5/548 | (2006.01) | |
| C08L 7/00 | (2006.01) | |
| C08L 9/00 | (2006.01) | |
| C08L 9/02 | (2006.01) | |
| C08L 9/06 | (2006.01) | |

(52) U.S. Cl.
CPC ............... *C08C 19/12* (2013.01); *C08C 19/44* (2013.01); *C08L 15/00* (2013.01); *C08L 21/00* (2013.01); *C08K 3/0033* (2013.01); *C08K 3/04* (2013.01); *C08K 3/34* (2013.01); *C08K 3/36* (2013.01); *C08K 5/548* (2013.01); *C08L 7/00* (2013.01); *C08L 9/00* (2013.01); *C08L 9/02* (2013.01); *C08L 9/06* (2013.01)

(58) Field of Classification Search
USPC ........................................................ 525/331.9
See application file for complete search history.

(56) References Cited

U.S. PATENT DOCUMENTS

| | | | |
|---|---|---|---|
| 5,310,798 A | 5/1994 | Lawson et al. | |
| 5,880,206 A | 3/1999 | Nakamura et al. | |
| 5,929,149 A * | 7/1999 | Matsuo | ................... C08C 19/44 524/262 |
| 7,335,706 B1 * | 2/2008 | Halasa | ................... B60C 1/0016 524/572 |
| 2004/0254301 A1* | 12/2004 | Tsukimawashi et al. | ..... 525/271 |
| 2010/0113683 A1 | 5/2010 | Matsumoto et al. | |

FOREIGN PATENT DOCUMENTS

| | | |
|---|---|---|
| EP | 0 639 587 A1 | 2/1995 |
| EP | 1 000 970 A1 | 5/2000 |
| EP | 1 072 442 A1 | 1/2001 |
| EP | 1 457 501 A1 | 9/2004 |
| EP | 1 721 930 A1 | 11/2006 |
| JP | 58 136604 | 8/1983 |
| JP | 7 149825 | 6/1995 |
| JP | 7 238188 | 9/1995 |
| JP | 9 235323 | 9/1997 |
| JP | 2004 168904 | 6/2004 |
| JP | 2005 298626 | 10/2005 |
| WO | 03 029299 | 4/2003 |

OTHER PUBLICATIONS

Extended European Search Report issued Nov. 4, 2010 in PCT/JP2008055340.

U.S. Appl. No. 13/638,767, filed Oct. 1, 2012, Nakamura, et al.

* cited by examiner

*Primary Examiner* — Ling Choi
*Assistant Examiner* — Thuy-Ai Nguyen
(74) *Attorney, Agent, or Firm* — Oblon, McClelland, Maier & Neustadt, L.L.P.

(57) ABSTRACT

The method for producing a modified conjugated diene based (co)polymer, according to the present invention comprises a step of reacting a conjugated diene based (co)polymer with a metal halide compound to obtain a modified conjugated diene based (co)polymer, the conjugated diene based (co)polymer having a weight-average molecular weight of 150,000 to 2,000,000 and being obtained by bonding, to a polymer having at least a conjugated diene unit, an alkoxysilyl group and an optionally protected primary amino group. The method can satisfactorily produce a conjugated diene based (co)polymer which has a high Mooney viscosity, excellent shape stability and good processability.

8 Claims, No Drawings

METHOD FOR PRODUCING MODIFIED CONJUGATED DIENE BASED (CO)POLYMER, MODIFIED CONJUGATED DIENE BASED (CO)POLYMER, AND RUBBER COMPOSITION

CROSS REFERENCE TO RELATED APPLICATION

This application is a continuation application of U.S. application Ser. No. 12/532,764, filed on Sep. 23, 2009, which is a 371 of PCT/JP08/055,340, filed on Mar. 21, 2008, and claims priority to the following applications: Japanese Patent Application No. 2007-077963, filed on Mar. 23, 2007.

TECHNICAL FIELD

The present invention relates to a method for producing a modified conjugated diene based (co)polymer, a modified conjugated diene based (co)polymer and a rubber composition. More particularly, the present invention relates to a method for producing a modified conjugated diene based (co)polymer, which enables production of a modified conjugated diene based (co)polymer having a high Mooney viscosity and excellent shape stability; a modified conjugated diene based (co)polymer obtained by such a production method; and a rubber composition.

BACKGROUND ART

In recent years, the demand for the lower fuel consumption of automobiles has become increasingly severe in connection with the social need for energy saving. In order to respond to such a demand, a further reduction in the rolling resistance of tire has been requested. As the method for reducing the rolling resistance of tire, the optimization of tire structure has been studied; however, it is generally conducted to use, as the rubber composition for tire, a material low in heat build-up.

In order to obtain such a rubber composition low in heat build-up, a number of technical studies have hitherto been made to develop a modified rubber for the rubber composition which contains silica and carbon black as a filler. There was proposed, for example, a method for producing a polymer, which comprises subjecting a conjugated diolefin or a conjugated diolefin and an aromatic vinyl compound to anionic polymerization in a hydrocarbon solvent by using, as an initiator, at least one compound selected from the groups consisting of organic alkali metals and organic alkaline earth metals, to obtain a polymer and then reacting the terminal of the polymer with a particular amino group-containing alkoxysilane compound (see, for example, Patent Literature 1).

Patent Literature 1: WO 03/029299 Pamphlet

DISCLOSURE OF THE INVENTION

Conjugated diene based (co)polymers obtained by such conventional methods, however, have a low Mooney viscosity and low shape stability (for example, inferior in cold flow) and accordingly have had a problem that they cause change in shape during the storage and their handling becomes difficult. They have had a further problem that, when, for example, their molecular weight is made larger in order to increase their Mooney viscosity, the processability is deteriorated.

The present invention has been made in view of such problems of the conventional art. The present invention provides a method for producing a modified conjugated diene based (co)polymer, which enables production of a modified conjugated diene based (co)polymer having a high Mooney viscosity, excellent shape stability and good processability; a modified conjugated diene based (co)polymer obtained by such a production method; and a rubber composition.

According to the present invention, there are provided a method for producing a modified conjugated diene based (co)polymer, a modified conjugated diene based (co)polymer and a rubber composition, all described below.

[1] A method for producing a modified conjugated diene based (co)polymer, which comprises a step of reacting a conjugated diene based (co)polymer with a metal halide compound to obtain a modified conjugated diene based (co)polymer, the conjugated diene based (co)polymer having a weight-average molecular weight of 150,000 to 2,000,000 and being obtained by bonding, to a polymer having at least a conjugated diene unit, an alkoxysilyl group and an optionally protected primary amino group.

[2] The method for producing a modified conjugated diene based (co)polymer, set forth in [1], wherein the polymer having at least a conjugated diene unit is a homopolymer of a conjugated diene, or a copolymer of a conjugated diene and an aromatic vinyl compound.

[3] The method for producing a modified conjugated diene based (co)polymer, set forth in [1] or [2], wherein the metal halide compound is a compound which generates hydrogen halide upon hydrolysis.

[4] The method for producing a modified conjugated diene based (co)polymer, set forth in any of [1] to [3], wherein the metal halide compound is a compound which contains at least one kind of metal atom selected from the group consisting of silicon (Si), tin (Sn), aluminum (Al), zinc (Zn), titanium (Ti) and zirconium (Zr).

[5] The method for producing a modified conjugated diene based (co)polymer, set forth in any of [1] to [4], wherein the metal halide compound is at least one kind of compound selected from the group consisting of trimethylsilyl chloride, dimethyldichlorosilane, methyltrichlorosilane, silicon tetrachloride, methyldichlorosilane, tin tetrachloride, diethyl aluminum chloride, ethyl aluminum sesquichloride, ethyl aluminum dichloride, zinc chloride, titanium tetrachloride, titanocene dichloride, zirconium tetrachloride and zirconocene dichloride.

[6] The method for producing a modified conjugated diene based (co)polymer, set forth in any of [1] to [5], wherein the conjugated diene based (co)polymer is a polymer obtained by the following reaction (I).

Reaction (I): An initiator containing at least either of an organic alkali metal and an organic alkaline earth metal is added to a hydrocarbon solvent containing a conjugated diene or a conjugated diene and an aromatic vinyl compound; the mixture is subjected to anionic polymerization to obtain a polymer; and the polymerization active terminal of the polymer obtained is reacted with at least one kind of compound selected from a compound represented by the following general formula (1) and a compound represented by the following general formula (2).

[Formula 1]

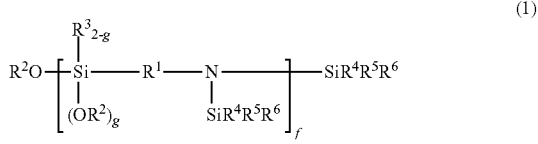

In the formula (1), $R^1$ is an alkylene group having 1 to 12 carbon atoms; $R^2$ and $R^3$ are each independently an alkyl group having 1 to 20 carbon atoms or an aryl group; $R^4$, $R^5$ and $R^6$ are each independently an alkyl group having 1 to 20 carbon atoms or an aryl group, or two of them may bond to each other to form a ring containing a Si atom to which they bond; g is an integer of 1 to 2; and f is an integer of 1 to 10.

[Formula 2]

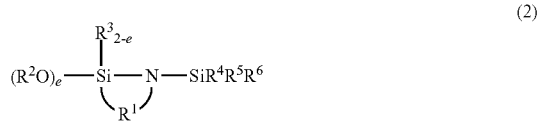

(2)

In the formula (2), $R^1$, $R^2$, $R^3$, $R^4$, $R^5$ and $R^6$ have the same definitions as given above; and e is an integer of 1 to 2.

[7] The method for producing a modified conjugated diene based (co)polymer, set forth in any of [1] to [6], wherein the conjugated diene based (co)polymer is reacted with the metal halide compound of such an amount that the total mols of the halogen atom becomes 1 to 10 times the total mols of the optionally protected primary amino group possessed by the conjugated diene based (co)polymer, to obtain the modified conjugated diene based (co)polymer.

[8] A modified conjugated diene based (co)polymer obtained by a method for producing a modified conjugated diene based (co)polymer, set forth in any of [1] to [7].

[9] A rubber composition containing, as the rubber component, a modified conjugated diene based (co)polymer set forth in [8].

[10] The rubber composition set forth in [9], further containing at least either of silica and carbon black.

[11] The rubber composition set forth in [10], which contains a rubber component containing 20 mass % or more of the modified conjugated diene based (co)polymer and at least either of silica and carbon black and contains the at least either of silica and carbon black in an amount of 20 to 120 parts by mass relative to 100 parts by mass of the rubber component.

[12] The rubber composition set forth in any of [9] to [11], wherein the rubber component consists of the modified conjugated diene based (co)polymer and other rubber component, the content of the modified conjugated diene based (co)polymer is 20 to 100 mass %, the content of the other rubber component is 0 to 80 mass % (the modified conjugated diene based (co)polymer+the other rubber component=100 mass %), and the other rubber component is at least one kind of rubber component selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

According to the present invention, there can be provided a method for producing a modified conjugated diene based (co)polymer, which enables production of a modified conjugated diene based (co)polymer having a high Mooney viscosity, excellent shape stability and good processability; a modified conjugated diene based (co)polymer obtained by such a production method; and a rubber composition.

BEST MODE FOR CARRYING OUT THE INVENTION

The best mode for carrying out the present invention is described below. However, the present invention is in no way restricted to the following embodiment. That is, it should be construed that the following embodiment may be subjected to appropriate changes, modifications, etc. based on the ordinary knowledge possessed by those skilled in the art, as long as there is no deviation from the gist of the present invention and that even such changed or modified embodiments belong to the scope of the present invention.

[1] Method for Producing Modified Conjugated Diene Based (Co)Polymer

The method for producing a modified conjugated diene based (co)polymer, of the present embodiment is a method for producing a modified conjugated diene based (co)polymer, which comprises a step of reacting a conjugated diene based (co)polymer with a metal halide compound to obtain a modified conjugated diene based (co)polymer, the conjugated diene based (co)polymer having a weight-average molecular weight of 150,000 to 2,000,000 and being obtained by bonding, to a polymer having at least a conjugated diene unit, an alkoxysilyl group and an optionally protected primary amino group.

With the production method comprising the above step, there can be easily produced a modified conjugated diene based (co)polymer having a high Mooney viscosity and excellent shape stability. With the thus-produced modified conjugated diene based (co)polymer, the vulcanization treatment conducted in production of a rubber composition thereof is easy and the rubber product obtained is excellent in rolling resistance, wet skid resistance and abrasion resistance. Incidentally, in the present Description, the "optionally protected primary amino group" refers to at least either functional group of primary amino group or protected primary amino group.

[1-1] Conjugated Diene Based (Co)Polymer

The conjugated diene based (co)polymer which is used as a base polymer in the method for producing a modified conjugated diene based (co)polymer, of the present embodiment, is a conjugated diene based (co)polymer having a weight-average molecular weight of 150,000 to 2,000,000 and being obtained by bonding, to a polymer having at least a conjugated diene unit, an alkoxysilyl group and an optionally protected primary amino group. Incidentally, the polymer having at least a conjugated diene unit is preferably a homopolymer of a conjugated diene, or a copolymer of a conjugated diene and an aromatic vinyl compound. Such a conjugated diene based (co)polymer is excellent in hysteresis loss property, abrasion resistance and fracture resistance. Incidentally, the weight-average molecular weight is a polystyrene-reduced weight-average molecular weight measured by gel permeation chromatography (GPC) (hereinafter, the weight-average molecular weight may be referred to as "Mw").

The content of the optionally protected primary amino group (hereinafter, the group may be referred to simply as "primary amino group"), possessed by the conjugated diene based (co)polymer is preferably 0.5 to 200 mmol/kg·polymer, more preferably 1 to 100 mmol/kg·polymer, particularly preferably 2 to 50 mmol/kg·polymer. Here, the "mmol/kg·polymer" means the mol (mmol) of primary amino group relative to the total mass (kg) of polymer component. Incidentally, the total mass of polymer component means the mass of polymer component alone excluding the additives (e.g. antioxidant) added during production or after production.

The primary amino group may be bonded to any of polymerization initiation terminal, polymerization termination terminal, polymer main chain and polymer side chain; however, the primary amino group is preferably introduced into polymerization initiation terminal or polymerization termination terminal because such introduction can hinder energy loss from polymer terminal and can improve hysteresis loss property.

When the number of the primary amino group possessed by the conjugated diene based (co)polymer is larger than 200 mmol/kg·polymer, the interaction between the modified conjugated diene based (co)polymer obtained and the reinforcing agent (e.g. carbon black or silica) is too strong, the viscosity of the compound obtained is high, and the processability thereof may be deteriorated. Meanwhile, when the number of the primary amino group is smaller than 0.5 mmol/kg·polymer, the effect by introduction of primary amino group hardly appears. That is, there is no sufficient improvement in the hysteresis loss property, abrasion resistance and fracture resistance of conjugated diene based (co)polymer, which is not preferred.

The content of the alkoxysilyl group possessed by the conjugated diene based (co)polymer is preferably 0.5 to 200 mmol/kg·polymer, more preferably 1 to 100 mmol/kg·polymer, particularly preferably 2 to 50 mmol/kg·polymer.

The alkoxysilyl group may be bonded to any of polymerization initiation terminal, polymerization termination terminal, polymer main chain and polymer side chain; however, the alkoxysilyl group is preferably introduced into polymerization termination terminal because such introduction can hinder energy loss from polymer terminal and can improve hysteresis loss property.

When the number of the alkoxysilyl group possessed by the conjugated diene based (co)polymer is larger than 200 mmol/kg·polymer, the interaction between the modified conjugated diene based (co)polymer obtained and the reinforcing agent (e.g. carbon black or silica) is too strong, the viscosity of the compound obtained is high, and the processability thereof may be deteriorated. Meanwhile, when the number of the alkoxysilyl group is smaller than 0.5 mmol/kg·polymer, the effect by introduction of alkoxysilyl group hardly appears. That is, there is no sufficient improvement in the hysteresis loss property, abrasion resistance and fracture resistance of conjugated diene based (co)polymer, which is not preferred.

The conjugated diene based (co)polymer used in the production method of the present embodiment is required to have a weight-average molecular weight of 150,000 to 2,000,000, as mentioned previously. When the weight-average molecular weight is smaller than 150,000, the rubber composition obtained is low in fracture resistance, abrasion resistance, hysteresis loss property, etc. Meanwhile, when the weight-average molecular weight is larger than 2,000,000, there occur inferior processability, inferior filler dispersion during kneading, and deterioration in fracture resistance, abrasion resistance, hysteresis loss property and wet skid property. The weight-average molecular weight of the conjugated diene based (co)polymer is preferably 150,000 to 1,700,000.

The Mooney viscosity (ML1+4, 100° C.) of the conjugated diene based (co)polymer is preferably in a range of 20 to 200. When the Mooney viscosity (ML1+4, 100° C.) is smaller then 20, there may be deterioration in fracture resistance, abrasion resistance and hysteresis loss property; meanwhile, when the Mooney viscosity (ML1+4, 100° C.) is larger than 200, there may a reduction in processability.

The polymer having at least a conjugated diene unit, used in production of the conjugated diene based (co)polymer is preferably a homopolymer of a conjugated diene, or a copolymer of a conjugated diene and an aromatic vinyl compound. As a specific preferred example thereof, a styrene-butadiene copolymer (SBR) can be mentioned.

The conjugated diene based (co)polymer can be obtained, for example, by adding an initiator containing at least either of an organic alkali metal and an organic alkaline earth metal, to a hydrocarbon solvent containing a conjugated diene or a conjugated diene and an aromatic vinyl compound, to give rise to anionic polymerization to obtain a polymer, then adding, to the polymer, a compound having a protected primary amino group and an alkoxysilyl group, to react the living terminal of the polymer with the compound.

As the more concrete method, there is preferably used a conjugated diene based (co)polymer obtained, for example, by the following reaction (I).

Reaction (I): An initiator containing at least either of an organic alkali metal and an organic alkaline earth metal is added to a hydrocarbon solvent containing a conjugated diene or a conjugated diene and an aromatic vinyl compound, to give rise to anionic polymerization to obtain a polymer; and the polymerization active terminal of the polymer obtained is reacted with at least one kind of compound selected from a compound represented by the following general formula (1) and a compound represented by the following general formula (2).

[Formula 3]

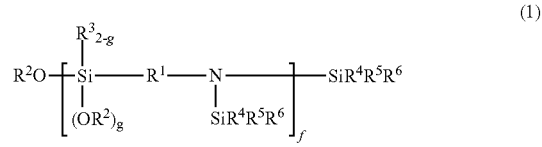

(1)

In the general formula (1), $R^1$ is an alkylene group having 1 to 12 carbon atoms; $R^2$ and $R^3$ are each independently an alkyl group having 1 to 20 carbon atoms or an aryl group; $R^4$, $R^5$ and $R^6$ are each independently an alkyl group having 1 to 20 carbon atoms or an aryl group, or two of them may bond to each other to form a ring containing a Si atom to which they bond; g is an integer of 1 to 2; and f is an integer of 1 to 10.

[Formula 4]

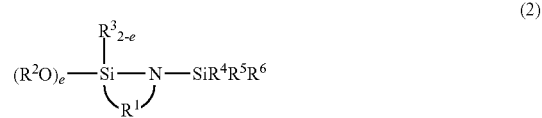

(2)

In the general formula (2), $R^1$, $R^2$, $R^3$, $R^4$, $R^5$ and $R^6$ have the same definitions as given above; and e is an integer of 1 to 2.

By the reaction (I), a primary amino group and an alkoxysilyl group can be easily introduced simultaneously in one step at a high introduction ratio.

In the general formula (1) and the general formula (2), as the $R^1$ which is an alkylene group having 1 to 12 carbon atoms, there can be mentioned, for example, methylene group, ethylene group and propylene group.

As the $R^2$, $R^3$, $R^4$, $R^5$ and $R^6$ when they are an alkyl group having 1 to 20 carbon atoms, there can be mentioned, for example, methyl group, ethyl group and propyl group.

As the $R^2$, $R^3$, $R^4$, $R^5$ and $R^6$ when they are an aryl group, there can be mentioned, for example, phenyl group, toluoyl group and naphthyl group.

When two of the $R^4$, $R^5$ and $R^5$ bond to each other to form a ring containing a silicon atom to which the two bond, the ring is preferably a 4- to 7-membered ring.

As the protective group for amino group, an alkylsilyl group can be mentioned. As the alkylsilyl group, there can be mentioned, for example, trimethylsilyl group, triethylsilyl group, triphenylsilyl group, methyldimethylsilyl group and ethylmethylphenylsilyl group.

As the compound having a protected primary amino group and an alkoxysilyl group, there can be mentioned, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, and N,N-bis(trimethylsilyl)aminoethylmethyldiethoxysilane. Preferred are N,N-bis(trimethylsilyl)aminopropylmethyldimethoxysilane, N,N-bis(trimethylsilyl)aminopropylmethyldiethoxysilane, or 1-trimethylsilyl-2,2-dimethoxy-1-aza-2-silacyclopentane.

The reaction between living polymer terminal (e.g. $P^-Li^+$) and N,N-bis(trimethylsilyl)aminopropylmethyldimethoxysilane can be expressed by the following reaction formula (3).

[Formula 5]

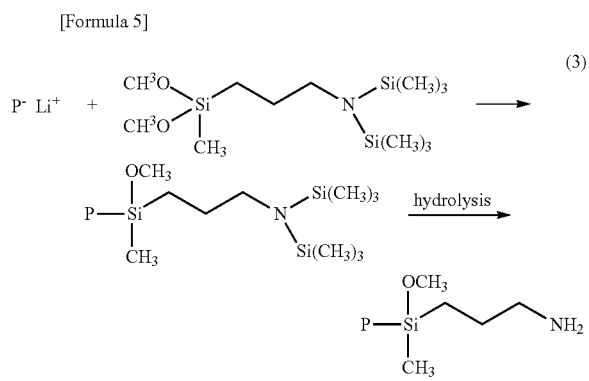

(3)

In the reaction formula (3), the P refers to a polymer containing a conjugated diene unit (specifically, a polymer of a conjugated diene or a copolymer of a conjugated diene and an aromatic vinyl compound).

Similarly, the reaction between living polymer terminal (e.g. $P^-Li^+$) and 1-trimethylsilyl-2,2-dimethoxy-1-aza-2-silacyclopentane can be expressed by the following reaction formula (4).

[Formula 6]

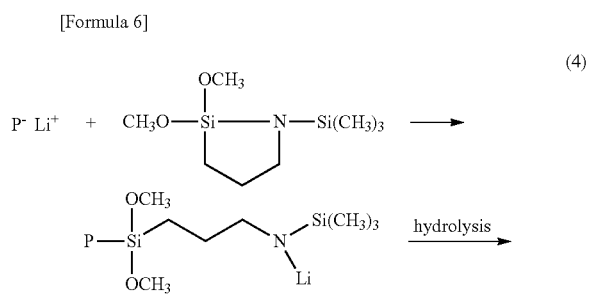

(4)

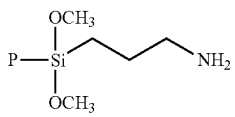

The 1-trimethylsilyl-2,2-dimethoxy-1-aza-2-silacyclopentane can be reacted with the terminals of 2 molecules, as expressed by the following reaction formula (5).

[Formula 7]

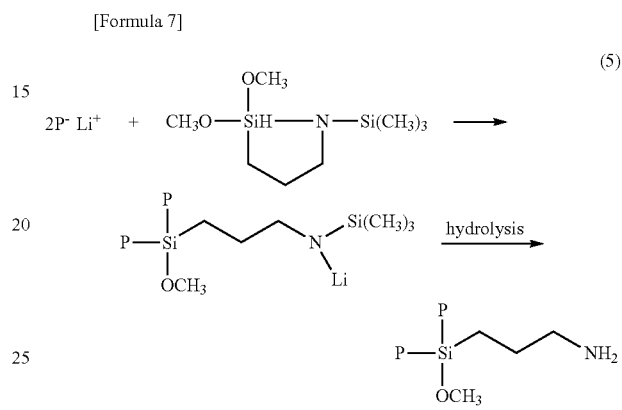

(5)

The conjugated diene based (co)polymer used in the method for production of modified conjugated diene based (co)polymer, of the present embodiment can also be obtained, for example, by adding, to a hydrocarbon solvent containing a conjugated diene or a conjugated diene and an aromatic vinyl compound, a lithium amide initiator represented by the following general formula (6) or the following general formula (7), to give rise to anionic polymerization to obtain a polymer and then adding thereto an alkoxysilane compound represented by the following general formula (8) to react it with the living terminal of the polymer.

[Formula 8]

$$(R^4R^5R^6Si)_2-N-R^1-Li \qquad (6)$$

In the general formula (6), $R^1$, $R^4$, $R^5$ and $R^6$ have the same definitions as in the general formula (1).

[Formula 9]

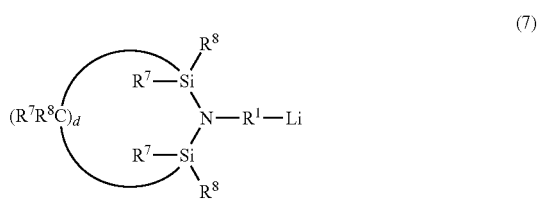

(7)

In the general formula (7), $R^1$ has the same definition as in the general formula (1); $R^7$ and $R^8$ are each independently hydrogen, an alkyl group having 1 to 20 carbon atoms or an aryl group; and d is an integer of 1 to 7.

[Formula 10]

(8)

In the general formula (8), $R^2$ and $R^3$ have the same definitions as in the general formula (1); X is a halogen atom; c is an integer of 0 to 2; and b is an integer of 1 to 4 with a proviso that c+b is an integer of 2 to 4.

The thus-obtained conjugated diene based (co)polymer is a polymer obtained by the polymerization of a conjugated diene or a conjugated diene and an aromatic vinyl compound and, optionally, a copolymerizable third monomer.

As the conjugated diene constituting the conjugated diene based (co)polymer, there can be mentioned, for example, 1,3-butadiene, isoprene, 2,3-dimethyl-1,3-butadiene, 2-chloro-1,3-butadiene, 1,3-pentadiene and a mixture thereof. The content of the conjugated diene unit in the total monomers is preferably 40 to 100 mass %, more preferably 50 to 95 mass %. When the content is less than 40 mass %, the modified conjugated diene based (co)polymer obtained is deteriorated in rolling resistance and abrasion resistance and, at low temperatures, becomes hard, which may result in reduced grip property and wet skid resistance.

As the aromatic vinyl compound, there can be mentioned, for example, styrene, 2-methylstyrene, 3-methylstyrene, 4-methylstyrene, α-methylstyrene, 2,4-dimethylstyrene, 2,4-diisopropylstyrene, 4-tert-butylstyrene, divinylstyrene, tert-butoxystyrene, vinylbenzyldimethylamine, (4-vinylbenzyl) dimethylaminoethyl ether, N,N-dimethylaminoethylstyrene, 2-tert-butylstyrene, 3-tert-butylstyrene, 4-tert-butylstyrene, vinylpyridine and a mixture thereof. Of these, styrene is preferred particularly. The use amount of the aromatic vinyl compound is preferably 60 mass % or less, more preferably 50 to 5 mass %, in the total monomers.

As the third monomer, there can be mentioned, for example, acrylonitrile, methyl methacrylate, ethyl methacrylate, methyl acrylate, ethyl acrylate, hydroxyethyl methacrylate and hydroxyethyl acrylate. The use amount of the third monomer is preferably 25 mass % or less, more preferably 15 mass % or less, particularly preferably 10 mass % or less, in the total monomers.

[1-1A] Method for Producing Conjugated Diene Based (Co)Polymer

Next, description is made on the method (the first method) for producing the conjugated diene based (co)polymer used in the method of the present embodiment for production of modified conjugated diene based (co)polymer.

The polymerization reaction and the reaction of an obtained polymer with a compound having a primary amino group (a protected primary amino group) and an alkoxysilyl group, conducted for obtaining a conjugated diene based (co)polymer, may be carried out at a given temperature condition or at an increasing temperature condition. A specific reaction temperature is preferably in a range of 0 to 120° C. The temperature for hydrolysis conducted for deprotection of protected primary amino group is preferably 80 to 150° C., more preferably 90 to 120° C. The hydrolysis is conducted in this temperature range by adding water or acidic water of at least 2 mols relative to one mol of the compound having a protected primary amino group and an alkoxysilyl group, to give rise to a reaction. The reaction time is preferably 10 minutes or more, more preferably 30 minutes or more. The mode of the polymerization may be any of batch polymerization and continuous polymerization.

As examples of the initiator (an organic alkali metal compound and an organic alkaline earth metal compound), used in the polymerization, there can be mentioned alkyl lithiums (e.g. n-butyl lithium, sec-butyl lithium and tert-butyl lithium), alkylene dilithiums (e.g. 1,4-dilithiobutane), phenyl lithium, stilbene lithium, lithium naphthalene, sodium naphthalene, potassium naphthalene, n-butyl magnesium, n-hexyl magnesium, ethoxy calcium, calcium stearate, tert-butoxy strontium, ethoxy barium, isopropoxy barium, ethylmercapto barium, tert-butoxy barium, phenoxy barium, diethylamino barium and barium stearate.

The organic alkali metal as the initiator can be used for copolymerization of conjugated diene and aromatic vinyl compound, in the form of a reaction product of secondary amine compound or tertiary amine compound. As the organic alkali metal reacted with the secondary amine compound or the tertiary amine compound, an organic lithium compound is preferred. More preferred is n-butyl lithium, sec-butyl lithium or tert-butyl lithium.

As examples of the secondary amine compound reacted with the organic alkali metal, there can be mentioned dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-ethylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-azabicyclo[3.2.2]nonane and carbazole.

As examples of the tertiary amine compound reacted with the organic alkali metal, there can be mentioned N,N-dimethyl-o-toluidine, N,N-dimethyl-p-toluidine, N,N-dimethyl-m-toluidine, α-picoline, β-picoline, γ-picoline, benzyldimethylamine, benzyldiethylamine, benzyldipropylamine, benzyldibutylamine, (o-methylbenzyl)dimethylamine, (m-methylbenzyl)dimethylamine, (p-methylbenzyl)dimethylamine, N,N-tetramethylene-o-toluidine, N,N-heptamethylene-o-toluidine, N,N-hexamethylene-o-toluidine, N,N-trimethylenebenzylamine, N,N-tetramethylenebenzylamine, N,N-hexamethylenebenzylamine, N,N-tetramethylene(o-methylbenzyl)amine, N,N-tetramethylene(p-methylbenzyl)amine, N,N-hexamethylene(o-methylbenzyl)amine, and N,N-hexamethylene(p-methylbenzyl)amine.

In the polymerization, there may be added as necessary, into the polymerization system, an ether compound (e.g. diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene or dimethoxyethane) and/or a tertiary amine compound (e.g. triethylamine, pyridine, N,N,N',N'-tetramethylethylenediamine, dipiperidinoethane, methyl ether of N,N-diethylethanolamine, ethyl ether of N,N-diethylethanolamine or butyl ether of N,N-diethylethanolamine), in order to control the micro structure (bound vinyl content) of the conjugated diene moiety of conjugated diene based (co)polymer.

As the hydrocarbon solvent, there can be mentioned, for example, pentane, hexane, heptane, octane, methylcyclopentane, cyclohexane, benzene, toluene and xylene. Of these, preferred are cyclohexane and heptane.

When, in production of the conjugated diene based (co)polymer, it is intended to enhance the reactivity of the initiator used or it is intended to array the aromatic vinyl compound introduced into the polymer at random or to arrange a simple chain of the aromatic vinyl compound into the polymer, a potassium compound may be added together with the polymerization initiator. As the potassium compound added together with the polymerization initiator, there can be used, for example, potassium alkoxides and potassium phenoxides, such as potassium isopropoxide, potassium tert-butoxide, potassium tert-amyloxide, potassium n-heptaoxide, potassium benzyl oxide, potassium phenoxide and the like; potassium salts of isovaleric acid, caprylic acid, lauric acid, palmitic acid, stearic acid, oleic acid, linoleic acid benzoic acid, phthalic acid, 2-ethylhexanoic acid, etc.; potassium salts of organic sulfonic acids such as dodecylbenzenesulfonic acid, tetradecylbenzenesulfonic acid, hexadecylbenzenesulfonic acid, octadecylbenzenesulfonic acid and the like; and potassium salts of organic phosphorous acid partial esters such as diethyl phosphite, diisopropyl phosphite, diphenyl phosphite, dibutyl phosphite, dilauryl phosphite and the like.

The potassium compound is added preferably in an amount of 0.005 to 0.5 mol per 1 gram atom equivalent of the alkali metal (initiator). When the addition amount is less than 0.005 mol, the addition effect of potassium compound (the improved reactivity by initiator and the randomization or simple chain arrangement of aromatic vinyl compound) may not appear; meanwhile, when the addition amount is more than 0.5 mol, there appear a reduction in polymerizability, a striking reduction in productivity, and a reduction in modification efficiency when the polymer terminal is modified with a functional group.

In production of the conjugated diene based (co)polymer, it is possible to add a coupling agent in combination with the alkoxysilane compound containing amino group (hereinafter, this compound may be referred to as "amino group-containing alkoxysilane compound"). Specific examples of the coupling agent are as follows. Incidentally, the coupling agent is added at a stage in which the conjugated diene based (co) polymer is formed using the amino group-containing alkoxysilane compound (specifically, prior to the addition of the amino group-containing alkoxysilane compound).

As the coupling agent reacted with the polymerization active terminal in combination with the amino group-containing alkoxysilane compound, there can be mentioned at least one kind of compound selected from the group consisting of (a) at least either of an isocyanate compound and an isothiocyanate compound, (b) at least either of an amide compound and an imide compound, (c) at least either of a pyridyl-substituted ketone compound and a pyridyl-substituted vinyl compound, (d) a silicon compound, (e) an ester compound, (f) a ketone compound and (g) a tin compound.

Of these compounds, there can be mentioned, as preferable examples of the component (a), that is, the isocyanate compound or the thioisocyanate compound, 2,4-tolylene diisocyanate, 2,6-tolylene diisocyanate, diphenylmethane diisocyanate, diphenylmethane diisocyanate of polymeric type (C-MDI), isophorone diisocyanate, hexamethylene diisocyanate, 1,3,5-benzene triisocyanate, and phenyl-1,4-diisothiocyanate.

As preferable examples of the component (b), that is, the amide compound or the imide compound, there can be mentioned amide compounds such as succinamide, phthalamide, N,N,N',N'-tetraethylphthalamide, oxamide, N,N,N',N'-tetramethyloxamide and the like; and imide compounds such as succinimide, N-methylsuccinimide, maleimide, N-methylmaleimide, phthalimide, N-methylphthalimide and the like.

As preferable examples of the component (c), that is, the pyridyl-substituted ketone compound or the pyridyl-substituted vinyl compound, there can be mentioned benzoylpyridine, diacetylpyridine and divinylpyridine.

As preferable examples of the component (d), that is, the silicon compound, there can be mentioned dibutyldichlorosilicon, methyltrichlorosilicon, methyldichlorosilicon, tetrachlorosilicon, triethoxymethylsilane, triphenoxymethylsilane, trimethoxysilane, methyltriethoxysilane, 4,5-epoxyhepthylmethyldimethoxysilane, and bis (triethoxysilylpropyl)tetrasulfide.

As preferable examples of the component (e), that is, the ester compound, there can be mentioned diethyl adipate, diethyl malonate, diethyl phthalate, diethyl glutarate and diethyl maleate.

As preferable examples of the component (f), that is, the ketone component, there can be specifically mentioned N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-aminoanthraquinone, and N,N,N',N'-tetramethyl-1,4-diaminoanthraquinone.

As preferable examples of the component (g), that is, the tin compound, there can be mentioned tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannyl)ethane), 1,4-bis(trichlorostannyl)butane, 1,4-bis(methyldichlorostannyl)butane, ethyl tin tris-stearate, butyl tin tris-octanoate, butyl tin tris-stearate, butyl tin tris-laurate, dibutyl tin bis-octanoate, dibutyl tin bis-stearate, dibutyl tin bis-octanoate, dibutyl tin bis-stearate and dibutyl tin bis-laurate.

These compounds reacted with the polymerization living terminal in combination with the amino group-containing alkoxysilane compound can be used singly or in combination of two or more kinds.

The use amount of the coupling agent may be 1 mol or less, preferably 0.1 to 0.5 mol per 1 gram atom equivalent of the alkali metal of the initiator, in terms of the amount of substituent capable of coupling in the coupling agent. When the amount is more than 1 mol, the reaction ratio of the compound of general formula (1) and the compound of the general formula (2) is low and desired properties may not be obtained.

Next, description is made on the other method (second method) for producing the conjugated diene based (co)polymer. In the other method for producing the conjugated diene based (co)polymer, a conjugated diene or a conjugated diene and an aromatic vinyl compound are subjected to anionic polymerization in a hydrocarbon solvent, using a lithium amide initiator represented by the general formula (6) or the general formula (7), to obtain a polymer; and an alkoxysilane compound represented by the general formula (8) is added thereto to react it with the living polymer terminal. The polymerization reaction using the lithium amide initiator having a protected primary amino group and the reaction with the alkoxysilane compound may be conducted at a given temperature condition or at an increasing temperature condition. A specific reaction temperature is preferably in a range of 0 to 120° C. The temperature for hydrolysis conducted for deprotection of protected primary amino group is preferably 80 to 150° C., more preferably 90 to 120° C. The hydrolysis is conducted in this temperature range by adding water or acidic water of at least 2 mols relative to one mol of the lithium amide initiator having a protected primary amino group, to give rise to a reaction. The reaction time is preferably 10 minutes or more, more preferably 30 minutes or more. The mode of the polymerization may be any of batch polymerization and continuous polymerization.

Incidentally, it should be construed that, except the matters described below, the matters described in the above-described method (the first method) can be applied per se or by making changes obvious to those skilled in the art.

As the lithium amide initiator represented by the general formula (6), there can be mentioned, for example, 3-[N,N-bis (trimethylsilyl)]-1-propyl lithium, 3-[N,N-bis(trimethylsilyl)]-2-methyl-1-propyl lithium, 3-[N,N-bis(trimethylsilyl)]-2,2-dimethyl-1-propyl lithium, 4-[N,N-bis(trimethylsilyl)]-1-butyl lithium, 5-[N,N-bis(trimethylsilyl)]-1-pentyl lithium, and 8-[N,N-bis(trimethylsilyl)]-1-octyl lithium.

As the lithium amide initiator represented by the general formula (7), there can be mentioned, for example, 3-(2,2,5,5-tetramethyl-2,5-disila-1-azabicyclopentane)-1-propyl lithium, 2-methyl-3-(2,2,5,5-tetramethyl-2,5-disila-1-azacyclopentane)-1-propyl lithium, 2,2-dimethyl-3-(2,2,5,5-tetramethyl-2,5-disila-1-azacyclopentane)-1-propyl lithium, 4-(2,2,5,5-tetramethyl-2,5-disila-1-azacyclopentane)-1-butyl lithium, and 6-(2,2,5,5-tetramethyl-2,5-disila-1-azacyclopentane)-1-hexyl lithium.

As the lithium amide initiator, there may be used a synthesis product obtained by reacting a corresponding halide with a corresponding organic lithium compound in a hydrocarbon solvent. Incidentally, the reaction of the halide and the organic lithium may be conducted beforehand in a reactor separate from the polymerization reactor.

As the alkoxysilane compound represented by the general formula (8), there can be mentioned, for example, tetramethoxysilane, tetraethoxysilane, tetrapropoxysilane, tetrabutoxysilane, tetraphenoxysilane, tetratoluoyloxysilane, methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane, diethyldiphenoxysilane, vinyltrimethoxysilane, vinyltriethoxysilane, vinyltripropoxysilane, vinyltributoxysilane, vinyltriphenoxysilane, allyltriphenoxysilane, octenyltrimethoxysilane, phenyltrimethoxysilane, phenyltriethoxysilane, phenyltripropoxysilane, phenyltributoxysilane, phenyltriphenoxysilane, trimethoxychlorosilane, triethoxychlorosilane, tripropoxychlorosilane, tributoxychlorosilane, triphenoxychlorosilane, dimethoxydichlorosilane, dipropoxydichlorosilane and diphenoxydichlorosilane.

Incidentally, as the conjugated diene based (co)polymer described heretofore, there can be preferably used, for example, a conjugated diene (co)polymer rubber described in WO 03/029299 filed by the present applicant.

[1-2] Metal Halide Compound

In the method for producing a modified conjugated diene based (co)polymer, of the present embodiment, the metal halide compound used for reaction with the above-described conjugated diene based (co)polymer is preferably a metal halide which generates hydrogen halide upon hydrolysis. By using such a metal halide compound, the reaction between the conjugated diene based (co)polymer and the metal halide compound can be conducted satisfactorily.

As the metal halide compound, there can be preferably used a metal halide compound containing at least one kind of metal atom selected from the group consisting of silicon (Si), tin (Sn), aluminum (Al), zinc (Zn), titanium (Ti) and zirconium (Zr).

Specifically, there can be mentioned, for example, at least one kind of compound selected from the group consisting of trimethylsilyl chloride, dimethyldichlorosilane, methyltrichlorosilane, silicon tetrachloride, methyldichlorosilane, tin tetrachloride, diethyl aluminum chloride, ethyl aluminum sesquichloride, ethyl aluminum dichloride, zinc chloride, titanium tetrachloride, titanocene dichloride, zirconium tetrachloride and zirconocene dichloride.

In the method for producing a modified conjugated diene based (co)polymer, of the present embodiment, the modified conjugated diene based (co)polymer, which is explained before, is preferably obtained, for example, by reacting the conjugated diene based (co)polymer obtained using the above-mentioned initiator, with the metal halide compound of such an amount that the total mols of the halogen atom becomes 1 to 10 times the total mols of the optionally protected primary amino group possessed by the conjugated diene based (co)polymer. When the total mols of the halogen atom are less than 1 time, the reaction between the conjugated diene based (co)polymer and the metal halide compound is insufficient, making it difficult to obtain a modified conjugated diene based (co)polymer having a high Mooney viscosity and excellent shape stability. When the total mols of the halogen atom is more than 10 times, the amount of hydrogen halide generated is large, which is not preferred.

[1-3] Production of Modified Conjugated Diene Based (Co)Polymer

In the method for producing a modified conjugated diene based (co)polymer, of the present embodiment, the above-described conjugated diene based (co)polymer having a weight-average molecular weight of 150,000 to 2,000,000, obtained by bonding an alkoxysilyl group and an optionally protected primary amino group to a polymer having at least conjugated diene unit is reacted with the above-described metal halide compound to produce a modified conjugated diene based (co)polymer.

In the method for producing a modified conjugated diene based (co)polymer, of the present embodiment, there can be recovered, after the reaction with the metal halide compound, the modified conjugated diene based (co)polymer by the solvent removal (e.g. steam stripping) and drying, both known in production of conjugated diene based (co)polymer.

As to the method for reaction of the conjugated diene based (co)polymer with the metal halide compound, there is no particular restriction, and the reaction can be conducted, for example, by adding water (per se or as a solution in solvent) to a solution of the polymer, followed by mixing, or by steam stripping conducted in recovery of the polymer.

The reaction temperature is preferably 10 to 150° C., more preferably 80 to 120° C.

The conjugated diene based (co)polymer used in the above step may be a polymer solution obtained in production of the conjugated diene based (co)polymer, which is not yet subjected to solvent removal, or a polymer solution obtained by subjecting the above polymer solution to solvent removal (e.g. steam stripping) and drying to obtain a conjugated diene based (co)polymer and then re-dissolving the polymer in a solvent (e.g. cyclohexane).

[2] Modified Conjugated Diene Based (Co)Polymer

The modified conjugated diene based (co)polymer of the present embodiment is a modified conjugated diene based (co)polymer obtained by the above-described method for producing a modified conjugated diene based (co)polymer. This modified conjugated diene based (co)polymer has a high Mooney viscosity, excellent shape stability and good processability.

The Mooney viscosity (ML1+4, 100° C.) of the modified conjugated diene based (co)polymer of the present embodiment is preferably 35 to 150, more preferably 40 to 120. When the Mooney viscosity (ML1+4, 100° C.) is lower than 35, the rubber properties including fracture resistance tend to be inferior. Meanwhile, when the Mooney viscosity (ML1+4, 100° C.) is higher than 150, the workability of the polymer is inferior, which may make difficult the kneading of the polymer with compounding agents.

[3] Rubber Composition

An embodiment of the rubber composition of the present invention contains the above-mentioned modified conjugated diene based (co)polymer as the rubber component. The detail description thereof is made below.

[3-1] Rubber Component

The rubber component contained in the rubber composition of the present embodiment contains the above-mentioned modified conjugated diene based (co)polymer which is an embodiment of the present invention. The content of the modified conjugated diene based (co)polymer in the rubber component is preferably 20 mass % or more, more preferably 30 mass % or more, particularly preferably 40 mass % or more. When the content of the modified conjugated diene based (co)polymer in the rubber component is less than 20 mass %, the rubber composition tends to be insufficient in mechanical properties (e.g. tensile strength and tensile elongation), crack propagation and abrasion resistance.

The rubber component may contain one kind or two or more kinds of the modified conjugated diene based (co)polymer. The rubber component may contain other rubber component, besides the modified conjugated diene based (co)polymer. As the other rubber component, there can be mentioned natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, mixtures thereof, etc.

[3-2] Other Component (Carbon Black and Silica)

Preferably, the rubber composition of the present embodiment further contains at least either of carbon black and silica. As specific examples of the carbon black, there can be mentioned various grade of carbon blacks such as SRF, GPF, FEF, HAF, ISAF, SAF and the like. A carbon black having an iodine adsorption amount (IA) of 60 mg/g or more and a dibutyl phthalate absorption amount (DBP) of 80 ml/100 g or more is preferred. Use of carbon black results in large improvements in the grip property and fracture resistance of rubber composition. HAF, ISAF and SAF all superior in abrasion resistance are preferred particularly. Carbon black can be used in one kind or in combination of two or more kinds.

As specific examples of silica, there can be mentioned wet silica (hydrous silicic acid), dry silica (anhydrous silicic acid), calcium silicate and aluminum silicate. Of these, wet silica is preferred because it is most striking in the improvement of fracture resistance and the balance of wet grip property and low rolling resistance. Silica can be used in one kind or in combination of two or more kinds.

The rubber composition of the present embodiment contains at least either of carbon black and silica, preferably in an amount of 20 to 120 parts by mass relative to 100 parts by mass of the rubber component and, from the standpoints of reinforcement and resultant property improvements, more preferably in an amount of 25 to 100 parts by mass. When the content of either or both of carbon black and silica is small, improvements in fracture resistance, etc. tend to be insufficient. Meanwhile, when the content is large, the processability of rubber composition tends to be low.

When, in the rubber composition of the present embodiment, silica is used as a reinforcing filler, it is preferred that a silane coupling agent is compounded for further enhancement of reinforcing effect. As the silane coupling agent, there can be mentioned, for example, bis(3-triethoxysilylpropyl) tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. Of these, bis(3-triethoxysilylpropyl) polysulfide and 3-trimethoxysilylpropylbenzothiazyl tetrasulfide are preferred for improved reinforcement, etc. These silane coupling agents can be used singly or in combination of two or more kinds.

The use amount of the silane coupling agent differs depending upon the kind of silane coupling agent used, etc. but is preferably 1 to 20 mass %, more preferably 3 to 15 mass % relative to 100 mass % of silica. When the use amount is smaller than 1 mass %, the effect of the coupling agent tends to be hardly exhibited. Meanwhile, when the amount is larger than 20 mass %, the gelling of the rubber component tends to appear.

To the rubber composition of the present embodiment may be added as necessary various chemicals and additives ordinarily used in the rubber industry, as long as the purpose of the present invention is not impaired. As various chemicals and additives which may be added to the rubber composition of the present embodiment, there can be mentioned, for example, a vulcanizing agent, a vulcanization aid, a processing aid, a vulcanization accelerator, a process oil, an antioxidant, an anti-scorching agent, zinc white and stearic acid.

As the vulcanizing agent, sulfur is used ordinarily. The use amount thereof is preferably 0.1 to 3 parts by mass, more preferably 0.5 to 2 parts by mass relative to 100 parts by mass of the raw material rubber (rubber component). As the vulcanization aid and the processing aid, stearic acid is used generally. The use amount thereof is 0.5 to 5 parts by mass relative to 100 parts by mass of the raw material rubber (rubber component). The vulcanization accelerator is not particularly restricted but there can be preferably mentioned thiazole type vulcanization accelerators such as M (2-mercaptobenzothiazole), DM (dibenzothiazyl disulfide), CZ (N-cyclohexyl-2-benzothiazylsulfenamide) and the like. The use amount thereof is ordinarily 0.1 to 5 parts by mass, preferably 0.2 to 3 parts by mass relative to 100 parts by mass of the raw material rubber (rubber component).

The rubber composition of the present invention can be produced by conducting kneading by using a kneader such as open type kneader (e.g. roll), closed type kneader (e.g. Banbury mixer) or the like. The rubber composition, by molding and subsequent vulcanization, can be used as various rubber products. The rubber composition of the present embodiment is suitable for tire applications (e.g. tire tread, under tread, carcas, side wall and bead) and applications (e.g. rubber vibration insulator, antiglare material, belt, hose and other industrial products). The rubber composition of the present embodiment is used particularly preferably as a rubber for tire tread.

EXAMPLES

The present invention is described specifically below by way of Examples. However, the present invention is in no way restricted to these Examples. In Examples and Comparative Examples, "parts" and "%" are based on mass unless otherwise specified. The measurement methods and evaluation methods of properties are shown below.

[Bound Styrene Content (%)]

Determined by 270 MHz $^1$H-NMR.

[Vinyl Content (%)]

Determined by 270 MHz $^1$H-NMR.

[Before-Modification Peak Molecular Weight]

This was determined as a polystyrene-reduced molecular weight from the retention time, in a GPC curve obtained by gel permeation chromatography (GPC) [trade name: HLC-8120 GPC (a product of Tosoh Corporation)], of the peak of the mountain of a polymer portion which excluded a polymer of increased molecular weight formed by the reaction of a multifunctional monomer, a compound reactive with silica and a coupling agent.

[Mooney Viscosity (ML1+4, 100° C.)]

Determined based on JIS K 6300, using an L rotor under the conditions of preheating=1 minute, rotor operating time=4 minutes, and temperature=100° C.

[Cold Flow (C/F)]

A polymer was extruded through a ¼ inch orifice at a pressure of 3.5 pound/inch$^2$ at 50° C. to measure its cold flow (C/F). The polymer was allowed to stand for 10 minutes in order to obtain its steady state; then, the rate of extrusion was measured and indicated as polymer milligrams per minute (mg/min). Incidentally, a smaller cold flow indicates superior shape stability (storage stability).

[Evaluation and Measurement of Properties of Rubber Composition]

(i) [Compound Mooney Viscosity]

An unvulcanized rubber compound was used as a test sample and measured for this item using an L rotor, based on JIS K 6300 under the conditions of preheating=1 minute, rotor operating time=4 minutes, and temperature=100° C. The obtained value was expressed as index. A larger index means superior processability.

(ii) [70° C. Tan δ]

A vulcanized rubber was used as a test sample and measured for this item, using a dynamic spectrometer (a product of U.S. Rheometrics, Inc.) under the conditions of tensile strain=0.7%, angular velocity=100 radian/sec, and 70° C. The obtained data was expressed as index. A larger index means a smaller (superior) rolling resistance.

(iii) [0° C. Tan δ]

A vulcanized rubber was used as a test sample and measured for this item, using a dynamic spectrometer (a product of U.S. Rheometrics, Inc.) under the conditions of tensile strain=0.14%, angular velocity=100 radian/sec, and 0° C. The obtained data was expressed as index. A larger index means a larger (superior) wet skid resistance.

(iv) [DIN Abrasion Test]

A vulcanized rubber was used as a test sample and measured for this item, using a DIN abrasion tester (a product of Toyo Seiki Seisakusho, LTD.), based on JIS K 6264, at a load of 10 N at 25° C. The obtained value was expressed as index. A larger index means a superior abrasion resistance.

Example 1

Into a 5-liter (internal volume) autoclave reactor purged with nitrogen were fed 2,500 g of cyclohexane, 25 g of tetrahydrofuran, 100 g of styrene and 390 g of 1,3-butadiene. The temperature of the reactor contents was controlled at 10° C. and then 335 mg of n-butyl lithium was added to initiate polymerization. The polymerization was conducted under an adiabatic condition and the maximum temperature reached 85° C. When the polymerization conversion reached 99% (after 26 minutes from the start of polymerization), additional 10 g of 1,3-butadiene was added in 2 minutes and polymerization was conducted for 3 minutes. Then, 1,400 mg of N,N-bis(trimethylsilyl)aminopropylmethyldiethoxysilane was added and a reaction was conducted for 15 minutes to obtain a polymer solution containing a conjugated diene based (co)polymer. The conjugated diene based (co)polymer had a before-modification peak molecular weight of 200,000.

Incidentally, whether or not the N,N-bis(trimethylsilyl) aminopropylmethyldiethoxysilane was coupled with the conjugated diene based (co)polymer, was confirmed by measuring the remainder of the N,N-bis(trimethylsilyl) aminopropylmethyldiethoxysilane in the polymer solution by gas chromatography, followed by reverse calculation.

To the obtained polymer solution containing a conjugated diene based (co)polymer was added 460 mg of silicon tetrachloride as a metal halide compound. Further, 2,6-di-tert-butyl-p-cresol was added. Then, steam stripping was conducted for solvent removal, followed by drying on a hot roll of 110° C., to obtain a modified conjugated diene based (co) polymer (Example 1). The properties, etc. of the modified conjugated diene based (co)polymer are shown in Table 1. Incidentally, 460 mg of the silicon tetrachloride is such an amount that the total mols of the chlorine atom of silicon tetrachloride becomes 2.1 times (Cl/Li molar ratio=2.1) the total mols of the organic group contained in 335 mg of the n-butyl lithium (organic alkali metal).

TABLE 1

| | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| Kind of metal halide compound | Silicon tetra- chloride | Silicon tetra- chloride | Silicon tetra- chloride | Silicon tetra- chloride | Dimethyl- dichloro- silane | Tin tetra- chloride | Diethyl aluminum chloride | Not used |
| Addition amount of metal halide compound (Cl/Li molar ratio) | 2.1 | 2.1 | 2.1 | 4.1 | 2.1 | 2.1 | 2.1 | Not used |
| Properties of modified conjugated diene based (co)polymer | | | | | | | | |
| Vinyl content (%) | 55 | 55 | 55 | 55 | 55 | 55 | 55 | 55 |

TABLE 1-continued

|  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| Bound styrene content (%) | 20 | 20 | 20 | 20 | 20 | 20 | 20 | 20 |
| Before-modification peak molecular weight (E + 0.4) | 20 | 20 | 20 | 20 | 20 | 20 | 20 | 20 |
| Mooney viscosity (ML1 + 4, 100° C.) | 65 | 64 | 62 | 62 | 61 | 66 | 65 | 17 |
| Cold flow (C/F) | 0.2 | 0.2 | 0.2 | 0.2 | 0.2 | 0.2 | 0.2 | 10 |

Example 2

Into a 5-liter (internal volume) autoclave reactor purged with nitrogen were fed 2,500 g of cyclohexane, 25 g of tetrahydrofuran, 100 g of styrene and 390 g of 1,3-butadiene. The temperature of the reactor contents was controlled at 10° C. and then 335 mg of n-butyl lithium was added to initiate polymerization. The polymerization was conducted under an adiabatic condition and the maximum temperature reached 85° C. When the polymerization conversion reached 990 (after 26 minutes from the start of polymerization), additional 10 g of 1,3-butadiene was added in 2 minutes and polymerization was conducted for 3 minutes. Then, 1,400 mg of N,N-bis(trimethylsilyl)aminopropylmethyldiethoxysilane was added and a reaction was conducted for 15 minutes. To the polymer solution after the reaction was added 2,6-di-tert-butyl-p-cresol to obtain a polymer solution containing a conjugated diene based (co)polymer. The conjugated diene based (co)polymer had a before-modification peak molecular weight of 200,000.

The obtained polymer solution containing a conjugated diene based (co)polymer was transferred into a 10-liter plastic bottle. Thereto was added 460 mg of silicon tetrachloride as a metal halide compound. Then, steam stripping was conducted for solvent removal, followed by drying on a hot roll of 110° C., to obtain a modified conjugated diene based (co)polymer (Example 2). The properties, etc. of the modified conjugated diene based (co)polymer are shown in Table 1.

Example 3

Into a 5-liter (internal volume) autoclave reactor purged with nitrogen were fed 2,500 g of cyclohexane, 25 g of tetrahydrofuran, 100 g of styrene and 390 g of 1,3-butadiene. The temperature of the reactor contents was controlled at 10° C. and then 335 mg of n-butyl lithium was added to initiate polymerization. The polymerization was conducted under an adiabatic condition and the maximum temperature reached 85° C. When the polymerization conversion reached 99% (after 26 minutes from the start of polymerization), additional 10 g of 1,3-butadiene was added in 2 minutes and polymerization was conducted for 3 minutes. Then, 1,400 mg of N,N-bis(trimethylsilyl)aminopropylmethyldiethoxysilane was added and a reaction was conducted for 15 minutes. To the polymer solution after the reaction was added 2,6-di-tert-butyl-p-cresol. Then, steam stripping was conducted for solvent removal, followed by drying on a hot roll of 110° C., to obtain a conjugated diene based (co)polymer.

The obtained conjugated diene based (co)polymer was dissolved in 3,000 g of cyclohexane, and 460 mg of silicon tetrachloride was added as a metal halide compound. Then, steam stripping was again conducted for solvent removal, followed by drying on a hot roll of 110° C., to obtain a modified conjugated diene based (co)polymer (Example 3). The properties, etc. of the modified conjugated diene based (co)polymer are shown in Table 1.

Example 4

A modified conjugated diene based (co)polymer (Example 4) was obtained in the same manner as in Example 1 except that 920 mg of silicon tetrachloride was used as a metal halide compound. The properties, etc. of the modified conjugated diene based (co)polymer are shown in Table 1. Incidentally, 920 mg of the silicon tetrachloride is such an amount that the total mols of the chlorine atom of the silicon tetrachloride becomes 4.1 times (Cl/Li molar ratio=4.1) the total mols of the organic group contained in 335 mg of n-butyl lithium (organic alkali metal).

Example 5

A modified conjugated diene based (co)polymer (Example 5) was obtained in the same manner as in Example 1 except that 460 mg of the silicon tetrachloride was changed to 700 mg of dimethyldichlorosilane (a metal halide compound). The properties, etc. of the modified conjugated diene based (co)polymer are shown in Table 1. Incidentally, 700 mg of the dimethyldichlorosilane is such an amount that the total mols of the chlorine atom of the dimethyldichlorosilane becomes 2.1 times (Cl/Li molar ratio=2.1) the total mols of the organic group contained in 335 mg of n-butyl lithium (organic alkali metal).

Example 6

A modified conjugated diene based (co)polymer (Example 6) was obtained in the same manner as in Example 1 except that 460 mg of the silicon tetrachloride was changed to 700 mg of tin tetrachloride (a metal halide compound). The properties, etc. of the modified conjugated diene based (co)polymer are shown in Table 1. Incidentally, 700 mg of the tin tetrachloride is such an amount that the total mols of the chlorine atom of the tin tetrachloride becomes 2.1 times (Cl/Li molar ratio=2.1) the total mols of the organic group contained in 335 mg of n-butyl lithium (organic alkali metal).

Example 7

A modified conjugated diene based (co)polymer (Example 6) was obtained in the same manner as in Example 1 except that 460 mg of the silicon tetrachloride was changed to 1,300 mg of diethyl aluminum chloride (a metal halide compound). The properties, etc. of the modified conjugated diene based (co)polymer are shown in Table 1. Incidentally, 1,300 mg of the diethyl aluminum chloride is such an amount that the total mols of the chlorine atom of the diethyl aluminum chloride becomes 2.1 times (Cl/Li molar ratio=2.1) the total mols of the organic group contained in 335 mg of n-butyl lithium (organic alkali metal).

Comparative Example 1

Into a 5-liter (internal volume) autoclave reactor purged with nitrogen were fed 2,500 g of cyclohexane, 25 g of tetrahydrofuran, 100 g of styrene and 390 g of 1,3-butadiene. The temperature of the reactor contents was controlled at 10° C. and then 335 mg of n-butyl lithium was added to initiate polymerization. The polymerization was conducted under an adiabatic condition and the maximum temperature reached 85° C. When the polymerization conversion reached 99% (after 26 minutes from the start of polymerization), additional 10 g of 1,3-butadiene was added in 2 minutes and polymerization was conducted for 3 minutes. Then, 1,400 mg of N,N-bis(trimethylsilyl)aminopropylmethyldiethoxysilane was added and a reaction was conducted for 15 minutes.

To the polymer solution after the above reaction was added 2,6-di-tert-butyl-p-cresol. Then, steam stripping was conducted for solvent removal, followed by drying on a hot roll of 110° C., to obtain a conjugated diene based (co)polymer (Comparative Example 1). The properties, etc. of the conjugated diene based (co)polymer are shown in Table 1. Incidentally, the polymer obtained in Comparative Example 1 is a conjugated diene based (co)polymer not subjected to any modification reaction with a metal halide compound.

(Production of Rubber Composition (Vulcanized))

Rubber compositions (vulcanized) were produced using each of the modified conjugated diene based (co)polymers obtained in Examples 1 to 7 and the conjugated diene based (co)polymer obtained in Comparative Example 1. The compounding recipes of these rubber compositions are shown in Table 2. The production of each rubber composition was conducted by producing a rubber composition (rubber compound) using a 250 ml Labo Plastomill and vulcanizing the rubber composition (rubber compound). Incidentally, the A kneading was conducted for about 3 minutes at 100° C.×50 rpm, in which the meter temperature of wet bulb was about 140° C. and the actual temperature was about 150° C. The B kneading (which was conducted by adding sulfur and a vulcanization accelerator to the rubber compound after the A kneading) was conducted for 1 minute at 70° C.×60 rpm. The vulcanization was conducted at 160° C. for 30 minutes. Each rubber composition (vulcanized) was measured for processability, rolling resistance, wet skid resistance and abrasion resistance. The results are shown in Table 3.

TABLE 2

| Compounding recipe of rubber composition | Parts |
|---|---|
| Modified conjugated diene based (co)polymer (Examples 1 to 7, Comparative Example 1) | 70 |
| High-cis butadiene rubber*1 | 30 |
| Silica*2 | 70 |
| Silane coupling agent*3 | 5.6 |
| Carbon black*4 | 5.6 |
| Extender oil*5 | 37.5 |
| Stearic acid | 2 |
| Anti-oxidant*6 | 1 |
| Zinc white | 3 |
| Vulcanization accelerator*7 | 1.5 |
| Vulcanization accelerator*8 | 1.8 |
| Sulfur | 1.5 |

*1BR 01 (trade name) (a product of JSR Corporation)
*21165 MP (trade name) (a product of Rhodia Japan Ltd.)
*3Si 69 (trade name) (a product of Evonik Degusa Japan Co., Ltd.)
*4Dia Black N 339 (trade name) (a product of Mitsubishi Chemical Corporation)
*5Fukkol Aromax #3 (trade name) (a product of Fuji Kosan Co., Ltd.)
*6NOCRAC 6C (trade name) (a product of Ouchi Shinko Chemical Industrial Co., Ltd.)
*7NOCCELER D (trade name) (a product of Ouchi Shinko Chemical Industrial Co., Ltd.)
*8NOCCELER CZ (trade name) (a product of Ouchi Shinko Chemical Industrial Co., Ltd.)

TABLE 3

| Properties of rubber composition | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Processability | Compound Mooney viscosity (index) | 98 | 99 | 99 | 98 | 99 | 101 | 100 | 100 |
| Rolling resistance | 70° C. tan δ (index) | 101 | 100 | 102 | 99 | 101 | 100 | 98 | 100 |
| Wet skid resistance | 0° C. tan δ (index) | 100 | 102 | 99 | 101 | 100 | 100 | 99 | 100 |
| Abrasion resistance | DIN abrasion test (index) | 99 | 100 | 101 | 99 | 100 | 98 | 99 | 100 |

[Discussion]

The modified conjugated diene based (co)polymers obtained in Examples 1 to 7, as compared with the conjugated diene based (co)polymer obtained in Comparative Example 1, have a high Mooney viscosity and a low cold flow value (superior shape stability); yet, the rubber compositions thereof show about the same values in processability (compound Mooney viscosity) and properties, as the rubber composition of Comparative Example 1. Specifically explaining, the properties of the rubber compositions of Examples 1 to 7 are in a range of 98 to 102 when the properties of the rubber composition of Comparative Example 1 was taken each as 100. Thus, it was confirmed that the method for producing a modified conjugated diene based (co)polymer, of the present invention can produce a modified conjugated diene based (co)polymer which has a high Mooney viscosity and a low cold flow value and yet can give a rubber composition not reduced in processability (compound Mooney viscosity) and properties.

INDUSTRIAL APPLICABILITY

The method for producing a modified conjugated diene based (co)polymer, of the present invention can produce a modified conjugated diene based (co)polymer which has a high Mooney viscosity, excellent shape stability and good processability. Therefore, the rubber composition containing the modified conjugated diene based (co)polymer obtained by the present invention can be used, for example, in tire applications (e.g. tire tread, under tread, carcas, side wall and bead) as well as in applications (e.g. rubber vibration insulator, antiglare material, belt, hose and other industrial products). The rubber composition is used particularly preferably as a rubber for tire tread.

The invention claimed is:

1. A method for producing a modified conjugated diene based (co)polymer, the method comprising reacting a conjugated diene based (co)polymer with a metal halide compound to obtain a modified conjugated diene based (co)polymer,
wherein the conjugated diene based (co)polymer has a weight-average molecular weight of 150,000 to 2,000,000, and is obtained by a process comprising bonding, to a polymer having at least a conjugated diene unit, an alkoxysilyl group and an [optionally] protected primary amino group, where the polymer is obtained by polymerization with an initiator comprising an organic lithium,
the conjugated diene based (co)polymer is reacted with the metal halide compound of such an amount that the total mols of the halogen atom becomes 1 to 10 times the total mols of the [optionally] protected primary amino group possessed by the conjugated diene based (co)polymer, to obtain the modified conjugated diene based (co)polymer, and
a ratio of the total mols of chlorine atoms of the metal halogen compound is 2.1 times or more of the total mols of the organic group contained in the organic lithium.

2. The method according to claim 1, wherein the polymer having at least a conjugated diene unit is a homopolymer of a conjugated diene, or a copolymer of a conjugated diene and an aromatic vinyl compound.

3. The method according to claim 1, wherein the metal halide compound is a compound which generates hydrogen halide upon hydrolysis.

4. The method according to claim 1, wherein the metal halide compound is a compound which comprises at least one kind of metal atom selected from the group consisting of silicon (Si), tin (Sn), aluminum (Al), zinc (Zn), titanium (Ti) and zirconium (Zr).

5. The method according to claim 1, wherein the metal halide compound is at least one kind of compound selected from the group consisting of trimethylsilyl chloride, dimethyldichlorosilane, methyltrichlorosilane, silicon tetrachloride, methyldichlorosilane, tin tetrachloride, diethyl aluminum chloride, ethyl aluminum sesquichloride, ethyl aluminum dichloride, zinc chloride, titanium tetrachloride, titanocene dichloride, zirconium tetrachloride and zirconocene dichloride.

6. The method according to claim 1, wherein the conjugated diene based (co)polymer is a polymer obtained by a process comprising:
adding an initiator comprising at least either of an organic alkali metal and an organic alkaline earth metal to a hydrocarbon solvent comprising a conjugated diene or a conjugated diene and an aromatic vinyl compound to obtain a mixture;
subjecting the mixture to anionic polymerization to obtain a polymer; and
reacting the polymerization active terminal of the polymer obtained with at least one kind of compound selected from a compound of formula (1) and a compound of formula (2)

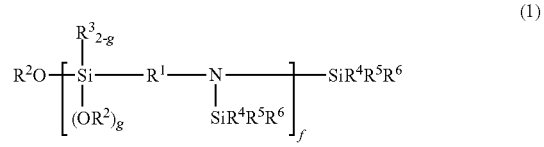

(1)

wherein in formula (1), $R^1$ is an alkylene group having 1 to 12 carbon atoms; $R^2$ and $R^3$ are each independently an alkyl group having 1 to 20 carbon atoms or an aryl group; $R^4$, $R^5$ and $R^6$ are each independently an alkyl group having 1 to 20 carbon atoms or an aryl group, or two of them may bond to each other to form a ring containing a Si atom to which they bond; g is an integer of 1 to 2; and f is an integer of 1 to 10, and

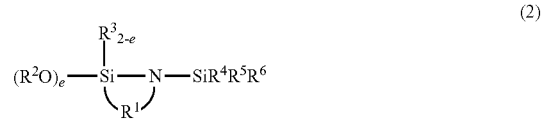

(2)

wherein in formula (2), $R^1$, $R^2$, $R^3$, $R^4$, $R^5$ and $R^6$ have the same definitions as given above; and e is an integer of 1 to 2.

7. The method according to claim 1, wherein the reaction is conducted by adding water.

8. The method according to claim 1, wherein the ratio of the total mols of chlorine atoms of the metal halogen compound is from 2.1 to 4.1 times of the total mols of the organic group contained in the organic lithium.

* * * * *